United States Patent [19]

Rouse

[11] Patent Number: 5,525,653
[45] Date of Patent: *Jun. 11, 1996

[54] RUBBER ASPHALT MIX

[76] Inventor: Michael W. Rouse, P.O. Box 8203, Vicksburg, Miss. 39182-0369

[*] Notice: The term of this patent shall not extend beyond the expiration date of Pat. No. 5,334,641.

[21] Appl. No.: 281,760

[22] Filed: Jul. 28, 1994

Related U.S. Application Data

[63] Continuation of Ser. No. 85,249, Jun. 30, 1993, Pat. No. 5,334,641, and a continuation of Ser. No. 822,292, Jan. 17, 1992, abandoned.

[51] Int. Cl.⁶ .................................................. C08L 95/00
[52] U.S. Cl. .................................. 524/71; 524/68
[58] Field of Search ........................... 524/59, 62, 64, 524/66, 67, 68, 71

[56] References Cited

U.S. PATENT DOCUMENTS

| | | | |
|---|---|---|---|
| 2,853,742 | 9/1959 | Dosher | 521/45.5 |
| 3,919,148 | 11/1975 | Winters et al. | 524/59 |
| 4,358,554 | 11/1982 | Yan et al. | 524/62 |
| 4,609,696 | 9/1986 | Wilkes | 524/71 |
| 5,334,641 | 8/1994 | Rouse | 524/71 |

Primary Examiner—Peter A. Szekely
Attorney, Agent, or Firm—Foley & Lardner

[57] ABSTRACT

A rubber modified asphalt for use as a paving compound is formed by reacting very fine ground particulate rubber with paving grade asphalt and mixing the combination at between 300 and 400 degrees F. The resulting mixture reacts fully within 25 minutes or less to form a freely pouring mixture; the reacted mixture can be held at normal asphalt working temperatures for at least 96 hours without degradation.

13 Claims, 5 Drawing Sheets

| TIME (HRS) | DIP-N-READ VISCOSITY (POISES) | SAMPLE TEMP (°F) | TANK TEMP (°F) | SOFTENING POINT (°F) | RESILIENCE (%) |
|---|---|---|---|---|---|
| 0.25 | 3.9 | 300 | 325 | 137 | 8.67 |
| 0.50 | 3.9 | 295 | 320 | 137 | 8.83 |
| 0.75 | 4.2 | 290 | 325 | 137 | 9.33 |
| 1.0 | 4.3 | 295 | 318 | 136 | 9.67 |
| 2.0 | 4.8 | 285 | 321 | 139 | 10.00 |
| 4.0 | 6.1 | 282 | 307 | 137 | 10.00 |
| 24 | 8.3 | 270 | 285 | 139 | 14.13 |
| 48 | 6.3 | 285 | 312 | 140 | 18.66 |
| 72 | 6.9 | 285 | 309 | 143 | 20.17 |
| 96 | 7.6 | 282 | 306 | 145 | 24.50 |

Fig 5

RUBBER ASPHALT MIX

This is a continuation of Ser. No. 08/085,249 filed on Jun. 30, 1993 now allowed as U.S. Pat. No. 5,334,641, continuation of Ser. No. 07/822,292 filed Jan. 17, 1992 abandoned.

BACKGROUND OF THE INVENTION

This invention relates to the field of rubber modified asphalts for use in sealing and paving materials.

It has long been recognized that the addition of particulate rubber to hot asphalt, where the rubber is blended and reacts fully or partially with the oils in the hot asphalt, provides a paving wear surface that has improved properties over that of asphalt alone as a paving material. In particular, rubber modified asphalts appear to have much longer effective lifetimes under a wide environmental condition, are less prone to the early development of stress cracking, and are more resistant to at least medium load traffic wear than plain asphalts. In addition, the rubber appears to have beneficial effects in reducing the evaporation of volatile oils from the asphalt, which is the principal predecessor to asphalt aging and failure, especially under the influence of heavy traffic, hot, dry climates, and excessive sunlight.

It is now generally recognized that the initial success in using crumb sized rubber particles to mix with asphalt is in part due to the nature of the rubber used. Asphalts have long been recognized as having extremely varying properties depending upon the source petroleum from which they are derive, and these properties are largely dependent upon the nature of the complex heavy oil within the asphalt. Asphalt may in fact be blended and cut with various oils to improve their properties. A detailed description of the known prior art rubber asphalt mixtures and solution products is given in Huff, U.S. Pat. No. 4,166,049, incorporated by reference herein, which points out that the nature of the rubber type and the asphalt oil content has been considered material in the prior art coarse crumb rubber.

Crumb rubber or particulate rubber is the product of reclamation processes, and has as a source material scrap rubber products. As a result, it is not a well defined material, and may consist of varying proportions of both natural rubbers and synthetic rubbers. Such rubbers are described more fully in Werner Hoffman, *Rubber Technology Handbook*, Oxford University Press (1989) (English Trans. of Kautschuk-Technologie, 1980). Various natural and synthetic rubber compositions vary considerably in their solubility in various oils and solvents, and some are far more resistant to devulcanization, which must occur if the rubber is to react fully with asphalt.

In the prior art, crumb rubber has generally only been widely available in sizes greater than a minus 30 mesh, due to limitations of rubber reclaiming technology. Only two processes are known for producing finer rubber; one is a cryogenic process which has only been used in test quantities due to its expense; the other is mill grinding of a crumb rubber slurry. The product of the latter process is referred to herein as ground particulate rubber.

The form of the rubber used with the asphalt affects considerably the properties of the resultant mix. Early work in rubber asphalts used primarily natural rubbers which reacted readily with the asphalts forming a suitably homogeneous blend of desirable properties. Early attempts to use synthetic rubbers with asphalts were not so successful as the synthetic rubbers generally resist the devulcanization and are more resistant to entering the gel state which is a typical intermediate encountered in creating a rubber solution with asphalt as part of the rubber asphalt reaction. This gel state is shown in McDonald, U.S. Pat. Nos. 3,891,585 and 4,069,182. McDonald discloses gelled compositions result when using crumb rubbers larger in particle size than minus 8 to minus 30 mesh.

The size of crumb and particulate rubber is difficult of definition as the particles are not uniform in shape, and tend to aggregate or clump together. Since there is no defined dimension on such a particle for measurement, the usual definition is to sort such particles by standard screens, and to define size by the screen mesh through which substantially all particles pass. Thus, such a screen size, for example a minus 16 mesh, means that substantially all particles are smaller than the mesh size of minus 16 mesh.

Thus, more recent work involving synthetic rubber crumb and asphalts shows that the resulting mixture, especially at the higher percentages of rubber, such as 20% and above, tends to form an extremely viscous gel which is resistant to spreading and creates great handling problem. Further, the mixture continues to react with time and thus must be mixed within a few hours prior to application, often must be cut with various extender oils in order to provide a mixture of suitably reduced viscosity to permit ready spreading and cannot be held for any length of time at an elevated temperature before applying.

As a result, rubber asphalt mixtures must now be mixed essentially on site or immediately prior to application, must be mixed in relatively small batches, requiring that the mixing equipment be localized and thus produce considerable quality and consistency problems in their application.

The additional handling required for on site mixing of rubber and asphalt to produce rubber asphalt mixtures also increases the cost of the mixture and introduces a complicating factor into the otherwise well developed central asphalt mixing and distribution industry.

SUMMARY OF THE INVENTION

We have discovered that by providing ground particulate rubber in extremely small sizes that the rubber will mix advantageously with hot asphalt. The finer particles of the rubber expose more surface for intermixing with the oils of the hot asphalt and as a result, the reaction of this finely ground rubber with the asphalt proceeds very fast.

We have further discovered that beneficially, the resulting asphalt mixture does not normally require the addition of extender oils to the rubber but rather than peaking at an unworkable viscosity rapidly decreases to a uniform and suitable viscosity and remains stable at this viscosity for an extended time. Further, the reaction beneficially can occur at a usefully lower temperature than that required for reaction of the coarser ground rubbers.

Of greatest importance however, is that we have discovered that a rubber asphalt mixture reacted from very fine ground rubber has excellent keeping properties without degradation. The material, once mixed, fully reacts within as little as ten minutes for mixtures of up to fifteen percent rubber and at somewhat higher temperatures it reaches an equilibrium between the unreacted particles, the partial depolymerized particle and completely depolymerization (constant viscosity) within twenty minutes for up to twenty-five percent rubber. Once the equilibrium occurs, the material maintains a uniform viscosity and physical properties and may be held merely by circulating the rubber asphalt mixture with a pump at a working temperature for an excess of twenty-four hours at a temperature lower than the reaction temperature.

We have further discovered that due to the beneficial reaction of the very fine ground vulcanized rubber that less rubber is required to achieve an equal amount of elastomeric effect in the asphalt compared to the more coarsely ground rubbers thus significantly reducing the cost of the rubber asphalt mix.

Since the rubber particles are small, the rubber particles can be pretreated with oil, including waste oils and other copolymers such as SBS, to prevent settling or separation of the particles during reaction with the asphalt mix. Also, the use of oil and other copolymers can enhance the overall properties of the resulting rubber modified asphalt mix. In the case of waste oil, such pre-coating may reduce the needed quantities of asphalt itself to form a desired modified asphalt mix. It appears that these beneficial properties result from the greatly increased surface area to mass ratio which occurs in finely ground rubber particles, which provides a large reaction surface for a wwide range of coatings and reactants. It is also believed that the beneficial properties and rapid reaction of the inventive mixture results in part from the enhanced surface area of such small particles.

Of greatest importance, it has been discovered that the reacted asphalt rubber mixes of the invention have a very long working pot life once reacted. Prior art Rubber Asphalt mixes lose their beneficial properties in as little as three to six hours after being mixed, and become unusable. As a result, all prior art rubber asphalt mixes have to be mixed at the point of application and rapidly applied. This requires specialized mixing equipment, which must be provided at each job site, with all the associated costs of specialized labor, equipment procurement and maintenance.

The inventive mixtures can. for the first time, be centrally mixed at an asphalt site. the working life of the mixture is at least 24 hours at normal asphalt temperatures. The centrally produced mixture may in all respects be made and treated as paving grade asphalt is now treated; no additional equipment is required. The mix may then be mixed with aggregate in a pug mill or otherwise produced, delivered and handled as current asphalt mixtures.

As a result, the invention makes possible a rubber asphalt mixture which can be blended at the asphalt plant and distributed, minimizing the costs of rubber asphalt.

It is thus an object of the invention to disclose a beneficial rubber asphalt mixture which has sufficiently good keeping qualities that it may be centrally mixed and held for distribution.

It is a further object of the invention to show an improved rubber asphalt mixture which has beneficial properties with less total quantity of rubber than heretofore required.

It is a further object of the invention to disclose beneficial rubber asphalt mixtures which have improved reaction rates and characteristics.

It is a further object of the invention to show a rubber asphalt mixture having a more quickly reached uniform viscosity characteristic.

It is a further object of the invention to disclose a rubber asphalt mixture which has a beneficial viscosity without requiring the addition of extender or reacting oils to increase the reaction between the rubber and the asphalt.

These and other objects of the invention will be more clearly seen in the detailed description of the preferred embodiment which follows.

BRIEF DESCRIPTION OF THE DRAWINGS

FIG. 5 is a table showing a test of the storage and holding properties of one sample of the invention over time.

DETAILED DESCRIPTION OF THE PREFERRED EMBODIMENT

Figure 1:
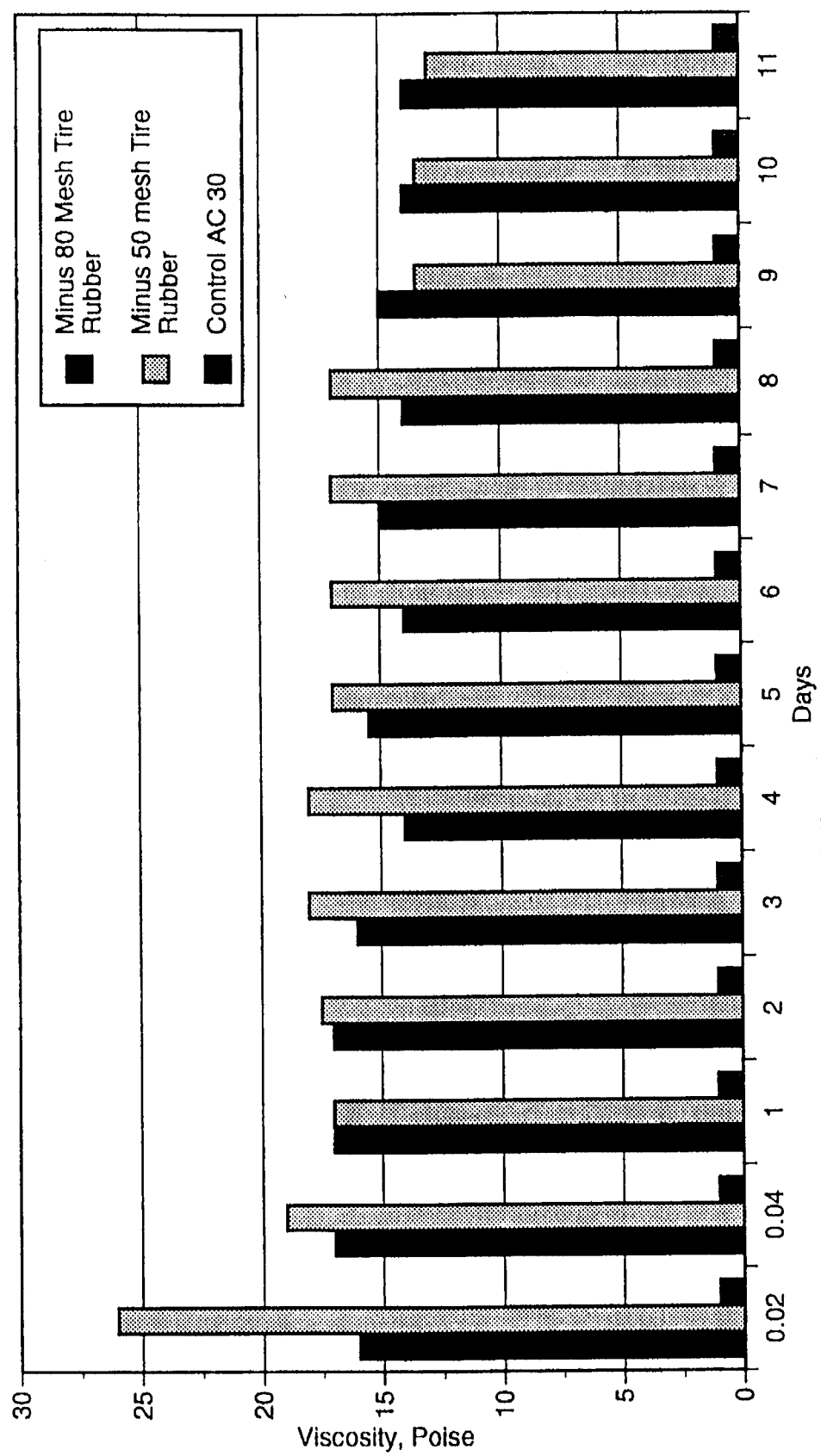
FIG. 1 is a Chart showing time versus viscosity data over an extended shelf life for minus 50 and minus 80 mesh ground particulate rubber asphalt mixtures.

Referring to the figures, I show reaction times at temperatures and resulting viscosities per series of tests of the invention. By comparison the prior art shows that mixing coarser rubber forms a jellied composition which is jellied, and will not readily pour.

The fine ground rubber used in the invention can be as coarse as a minus 50 mesh ground particulate rubber (referred to as GF50), and is preferably a minus 80 mesh rubber (referred to as GF80, a product sold under the trademark "ULTRAFINE"); such size designations are defined in the sense that the rubber is ground to the point that all the ground particles will pass through a minus 80 mesh size. The mean particle size of the rubber is approximately a minus 200 mesh mean particle, defined as fifty percent of the particles will be captured by a minus 200 mesh and fifty percent of the particles will pass through. The actual dispersion of particle sizes is fairly broad around the minus 200 mesh size.

In contrast with the more coarsely ground rubbers shown in the prior art, minus 80 mesh ground particulate rubber is a free flowing, very fine black powder consisting of ground vulcanized rubbers, in varying mixtures of both natural and synthetic rubber. The material is essentially free of fiber and other non-elastomeric materials but is a fully reactive vulcanized rubber powder.

As rubber is ground to very fine sizes, the grinding process produces a rough surface having extensive exposure of broken polymer chains. The small size of the particles also greatly increases the ratio of the exposed surface area of the average particle to its mass. This exposure of reactive surface area is much greater in fine rubber particles produced by mechanical grinding between grinding stones, than it is in fine particles produced by cyrogenic processes; the latter have smoother surfaces. The result is a particle which reacts more quickly and completely with a wide range of surface reacting agents, including oils, and solvents.

It is believed, from the significant change in the properties of asphalt rubber mixtures of the inventive type as compared to the prior art, that the reactive behovior of such small particles is qualitatively different than larger crumb rubbers.

It is believed that this grinding of the rubber additive is significant to the rubber asphalt mixture claimed. Ground particulate rubber has been mechanically abraded at least twice during its manufacture; once during reduction of the source rubber to a crumb stage, and then finely ground in abrasive mills. The resulting particles have very irregular surfaces, and have a very high surface area to volume ratio. As a result, reaction times of the ground particulate rubber with solvents or chemicals appear to be markedly faster, especially as the size of the particle decreases. It is believed that the fine rubber particles produced by cryogenic processes have much smoother surfaces, and will not show the same reaction effects; such rubbers may not form the claimed composition.

In a series of tests, two sizes of ground particulate rubber were blended with AC5 asphalt at a temperatures of 340 degrees F., and the resulting mixture held at 325 degrees F. AC5 Asphalt is considered a low viscosity paving grade asphaltic oil, and is typically specified for paving operations in cooler areas of the United States. Normally, paving grade asphaltic mixtures are created by mixing such asphaltic oils with aggregates at between 300 and 375 degrees, and the test temperature was chosen to typify the range of temperatures usually encountered in asphaltic pavement processing plants.

Proportions of rubber to asphalt were between 5% rubber and 20% rubber by weight in proportion to the asphaltic oil.

Figure 2:
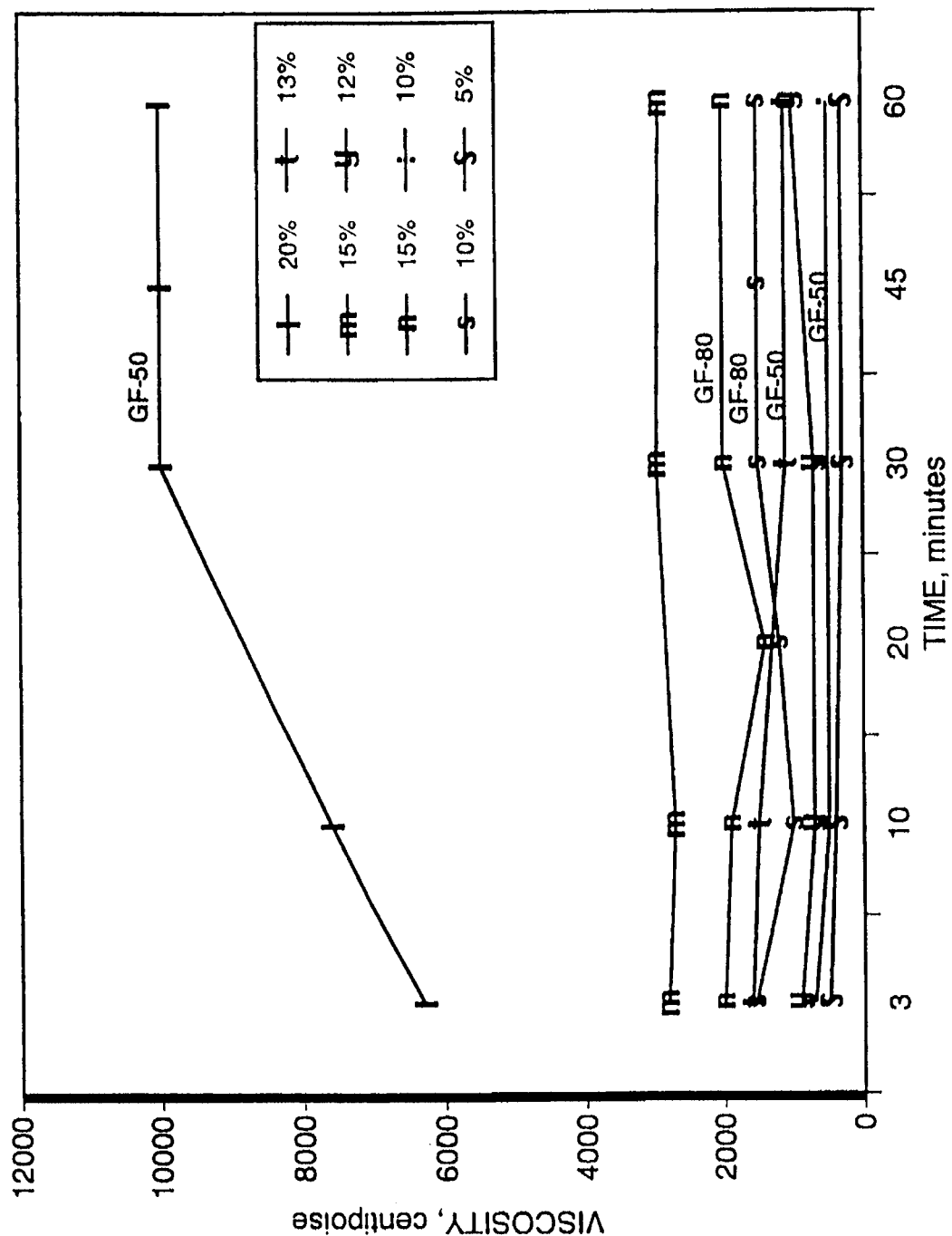
FIG. 2 is a Chart showing time versus viscosity curves showing minus 50 and minus 80 mesh ground particulate rubber at various concentrations during initial reaction with asphalt at one temperature.

The prior art teaches that rubber forms a viscous gel upon attack by hot oil such as the reacting agents in an asphalt. By contrast, the test data shows that At 340 degrees F. (all temperatures throughout are in degrees Fahrenheit) the inventive rubber mixtures through 15% rubber stabilized at an end point viscosity of between 5 and 28 poise in well under ten minutes at 340 degrees F. (FIG. 2)

Figure 3:
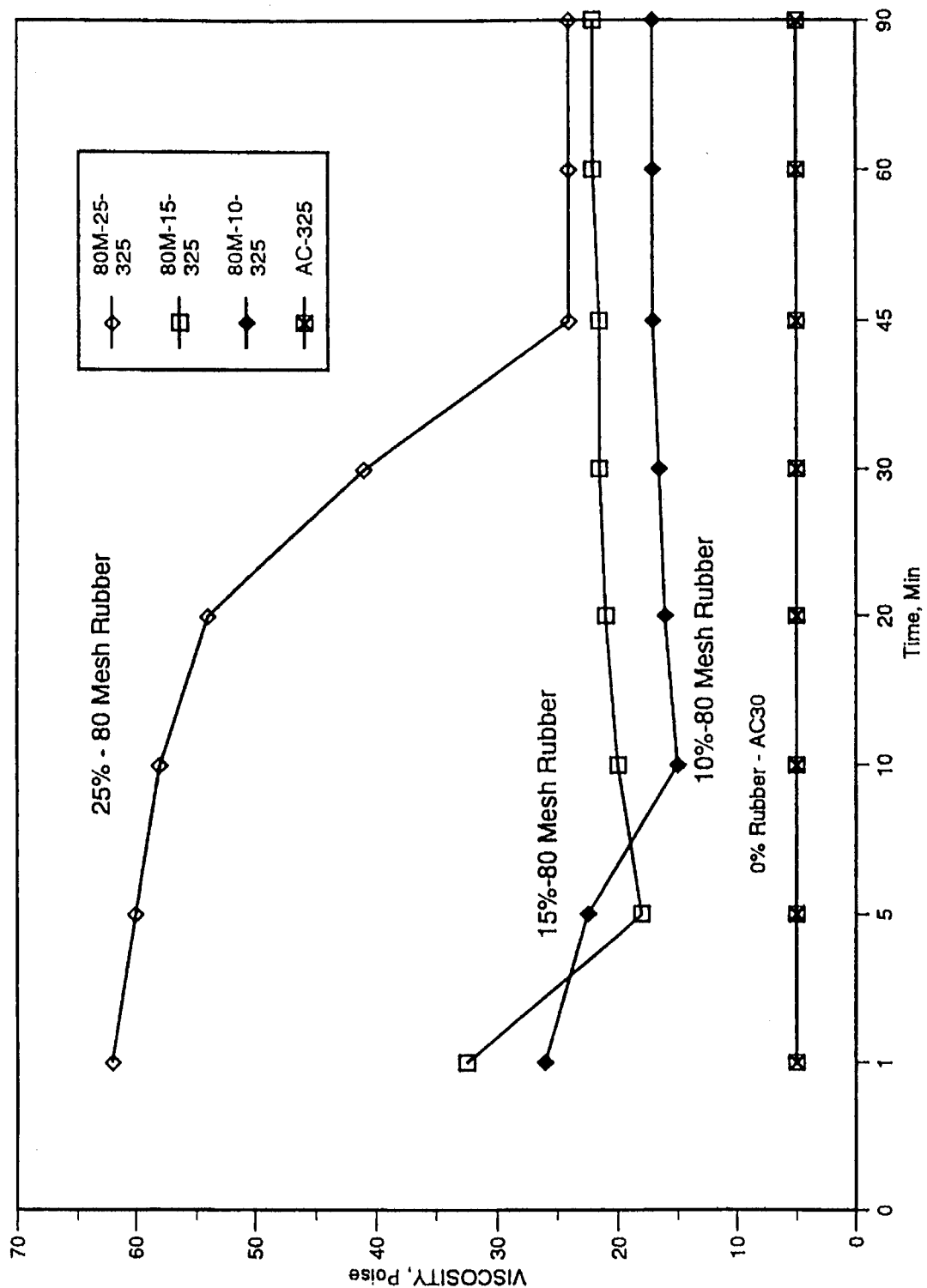
FIG. 3 is a Chart showing time versus viscosity curves showing minus 80 mesh ground particulate rubber during initial reaction with asphalt at a lower temperature.
Figure 4:
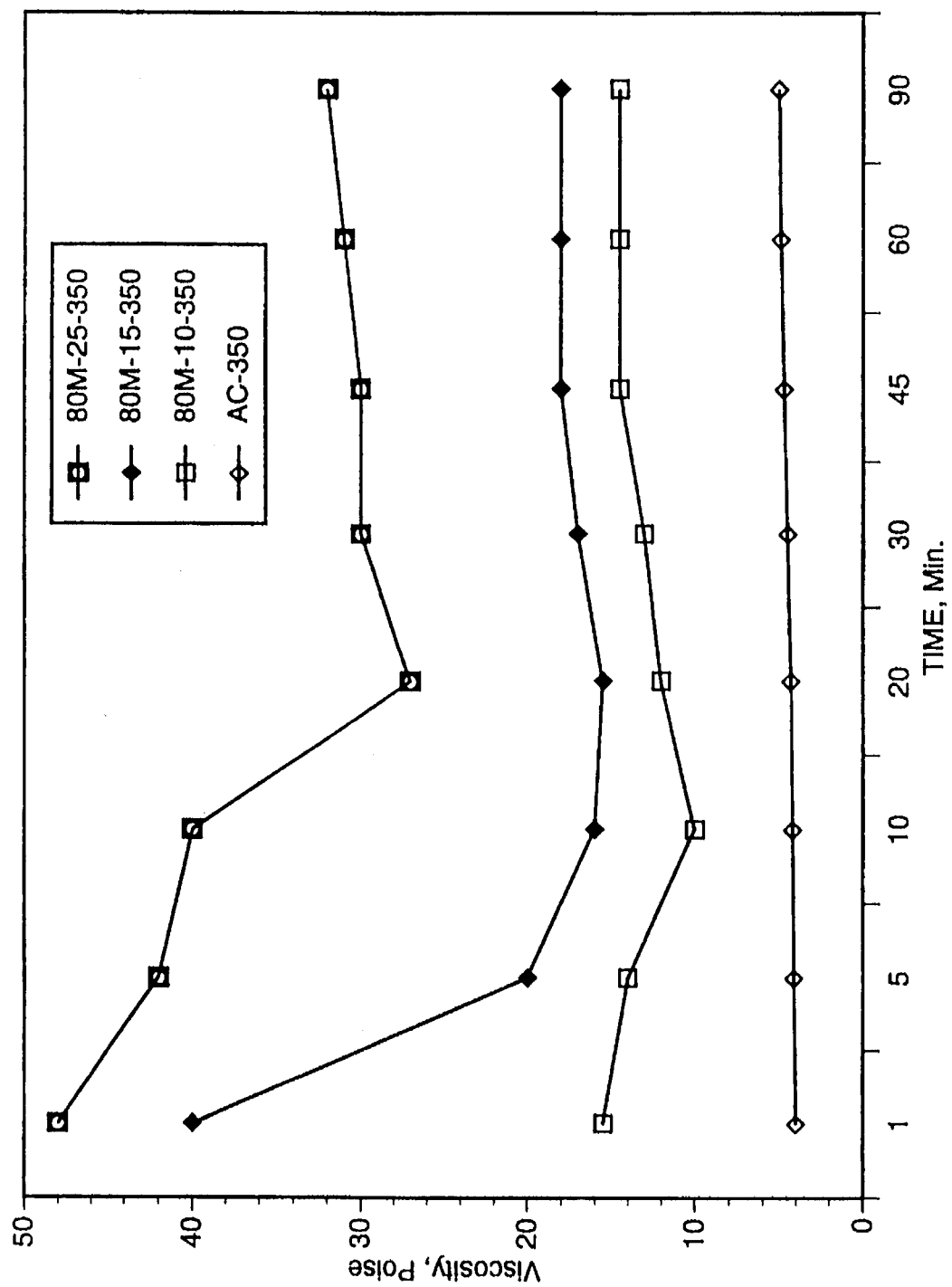
FIG. 4 is a Chart showing time versus viscosity curves showing minus 80 mesh ground particulate rubber during initial reaction with asphalt at a higher temperature.

FIGS. 3 and 4 show a separate series of tests using minus 80 mesh rubber additive to form rubber asphalt mixtures of the inventive type. At 350 degrees F., the reaction was swift, the rubber mixtures through 15% rubber substantially reaching an end viscosity within five minutes and stabilizing within ten to fifteen minutes. A 25% rubber mixture reached a stable viscosity within 20 minutes. At 325 Degrees, the mixtures through 15% rubber reacted to an end viscosity in under 10 minutes. At the end viscosities, the resulting rubber asphalt mixtures were homogenous, freely pouring mixtures.

The examples show over a wide range of temperatures, rubber particle sizes and concentrations that the variation in viscosity is smoothly continuous when any of these factors are varied, and a smooth pouring mixture, with stable long term keeping properties, occurs at all such combinations. A practitioner skilled in the art will readily see from this data how to pick a suitable combination of rubber size, percentage, and temperature to produce a desired product.

325 degrees is not the lower limit for production of the claimed mixtures and 375 degrees is not the upper limit. Since viscosity increases smoothly with increased rubber percentage for any give size of rubber, more than 25% rubber may be used, especially with minus 80 mesh rubber, without producing a mixture too viscous to freely pour. Since minus 80 mesh rubber has approximately a median particle size of minus 200 mesh, it seems clear from the data that even finer particle sizes will produce freely pouring mixtures at even higher percentages of rubber.

Thus the mixture can be initially reacted at, for example 350 degrees F., reacting fully in less than 20 minutes; it can then be held for at least eleven days at below 350 degrees F. without degradation of any properties.

When the resulting fine ground rubber asphalt mix is mixed and held at temperature with circulation for 96 hours it can be seen that the viscosity and the physical properties of the mixture do not substantially change from that point reached within ten minutes of reaction. It is thus apparent that the mixture can be centrally mixed with great rapidity, using in in-line processing, and then held as with conventional hot asphalt mixes for a substantial period of time. This makes it practicable, for the first time, to centrally mix rubber asphalt mixes in a central mixing plant such as an asphalt plant and then to hold the resulting mix for delivery and application as with current hot asphalt technology. It is believed that this will significantly change the economics of rubber asphalt mixture as the prior art rubber asphalt mixtures were unstable with time and had reported pot life of less than seven hours before they became unworkable and had to be disposed of.

In FIG. 5, a test is shown in which a minus 80 mesh ground particulate rubber asphalt mixture is held at between 350 degrees and 282 degrees for 96 hours, typifying storage of hot asphalt mixtures in a processing plant. No degradation of the mixture occurs. By comparison, prior art rubber asphalt mixtures have a reported pot life of generally less than seven hours before they must be used or discarded due to temperature induced degradation.

It can thus be seen from the examples given that the use of a very fine particulate ground vulcanized rubber produces a particularly advantageous rubber asphalt mixture having a quick reaction to a full blend and having an extraordinarily longer holding life at temperature than the rubber asphalt mixtures of the prior art.

While the tested data shows two ground particulate rubbers: a minus 50 mesh and a minus 80 mesh tire rubber, it should be apparent that the invention extends to fine rubber particles over a wide range of sizes as shown in the examples given.

Thus the invention extends to that wider range of rubber particle sizes as are inherent in the claims.

Additionally, unlike the coarser crumb rubber materials, typically 10 to 30 mesh, the finished powders remain very stable when stored for extended time periods. Surface treatment of the fine tire particles with a copolymer, or waste oil allows the reacted rubber particles to stay in suspension in holding tanks either at the refinery or asphalt plant and reduce or eliminate the need for special holding or storage tanks.

It should be apparent that the invention extends to the wider range of equivalent compounds as are claimed.

I claim:

1. An asphalt paving compound comprising:

paving grade asphalt;

finely ground particulate rubber which passes a −50 to −80 mesh in at least five percent by weight to asphalt;

said asphalt and said rubber being reacted together for less than 25 minutes at less than a temperature above 375 degrees Fahrenheit, forming thereby a non-gel asphalt rubber mixture without additional solvents.

2. The compound of claim 1, said asphalt and said rubber being reacted together to form a freely pouring homogenous mass.

3. The compound of claim 1, said asphalt and said rubber being reacted together from between 5 and fifteen minutes at between 300 and 375 degrees Fahrenheit.

4. The compound of claim 1, comprising between 5 and 25 percent by weight particulate ground rubber.

5. The compound of claim 2, comprising at least 10 percent by weight particulate ground rubber.

6. A freely flowing rubber asphalt compound comprising:

paving grade asphalt, mixed at normal asphalt processing temperatures with at least five percent by weight of asphalt of finely ground particulate rubber which passes a −50 to −80 mesh, for fifteen minutes or less, said compound thereby forming a freely flowing, non-gelled mass.

7. The compound of claim 6, said ground particulate rubber being between 5 and 25 percent by weight of said mixture.

8. The compound of claim 6, said ground particulate rubber being proportioned to said asphalt at at least one part in twenty.

9. The compound of claim 6, said ground particulate rubber being proportioned to said asphalt in a ratio of between one part in twenty and one part in three.

10. A rubber asphalt compound comprising:

paving grade asphalt;

finely ground particulate rubber which passes an 80 mesh size wherein all the rubber reacts with all the asphalt at normal asphalt working temperatures to form a freely flowing non-gelled paving grade rubber - asphalt mixture.

11. The compound of claim 10, said rubber reacting with said asphalt to form said mass in less than 30 minutes.

12. The compound of claim 10, further characterized in that said compound forms a stable freely flowing mass which can be held at about 300 degrees Fahrenheit for at least 24 hours without degradation.

13. The compound of claim 10, said ground particulate rubber being proportioned to said asphalt in a ratio of between one part in twenty and one part in three.

* * * * *